Figure 1:
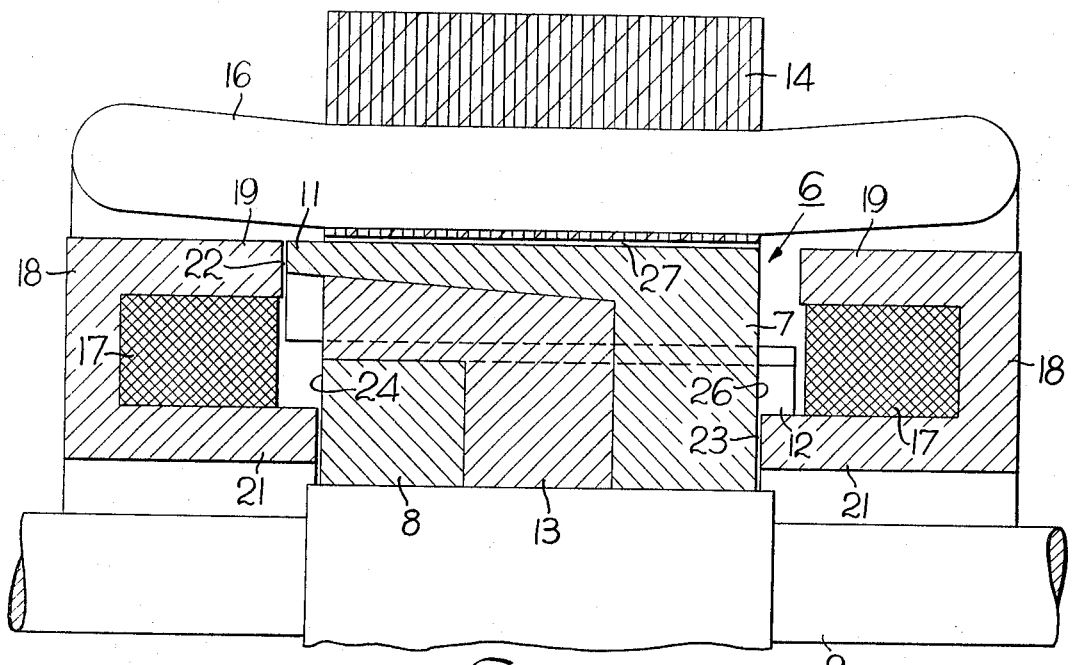

United States Patent
Wagner et al.

[15] 3,663,846
[45] May 16, 1972

[54] CLAW-TOOTH ROTOR DYNAMOELECTRIC MACHINE

[72] Inventors: Paul D. Wagner, 549 Ludlow Ave., Cincinnati, Ohio 45220; John J. Keuper, 7 Alanna Drive, Cold Springs, Ky. 41076

[22] Filed: June 7, 1971

[21] Appl. No.: 150,685

[52] U.S. Cl. ............................310/164, 310/168, 310/263
[51] Int. Cl. .........................................................H02k 1/22
[58] Field of Search ..............310/164, 168, 263, 49 A, 207, 310/162

[56] References Cited

UNITED STATES PATENTS

| | | |
|---|---|---|
| 588,602 | 8/1897 | Rice...................................310/168 |
| 2,802,959 | 8/1957 | Powers.............................310/263 X |
| 3,321,652 | 5/1967 | Opel.................................310/263 X |
| 3,452,228 | 6/1969 | Woolley...........................310/263 X |

*Primary Examiner*—D. F. Duggan
*Attorney*—John P. Hines, Robert B. Benson and Lee H. Kaiser

[57] ABSTRACT

A synchronous machine having a Lundell-type rotor is provided with a stationary excitation winding positioned at the axial end of the rotor with a continuous annular magnetic flux collector core surrounding the winding. This collector provides a dual, relatively shorter, continuous flux path between alternate poles of the rotor as it sweeps past the flux collector without including the stator yoke or housing in the flux path.

2 Claims, 2 Drawing Figures

Patented May 16, 1972

3,663,846

Inventors
Paul W. Wagner
John J. Kemper
by John P. Hines
Attorney

CLAW-TOOTH ROTOR DYNAMOELECTRIC MACHINE

This invention pertains in general to dynamoelectric machines and more particularly to a synchronous dynamoelectric machine having a Lundell-type rotor and a stationary excitation winding.

A synchronous Lundell-type machine has the advantage of being able to operate at high speeds because of the absence of conventional windings on the rotor. Additionally, the absence of rotating excitation windings obviates the necessity of providing slip rings, brushes, or permanent magnets. Such machines have, however, been relatively expensive to manufacture. One reason for this added expense is because the stator yoke and/or housing provide a portion of the magnetic flux path for the machine. This requires that the yoke and/or housing be constructed of a more expensive, permeable material.

It is the general object of this invention to provide a Lundell-type dynamoelectric machine of more simplified and inexpensive construction.

An additional object of the subject invention is to provide a synchronous Lundell-type machine having a fixed non-pulsating level of excitation current.

A further object of the invention is to provide a machine of the above identified type with a dual, relatively shorter, and therefore more efficient, flux path.

A more specific object of the subject invention is to provide a machine of the above identified type wherein neither the stator housing nor yoke is included in the magnetic flux path.

Figure 2:
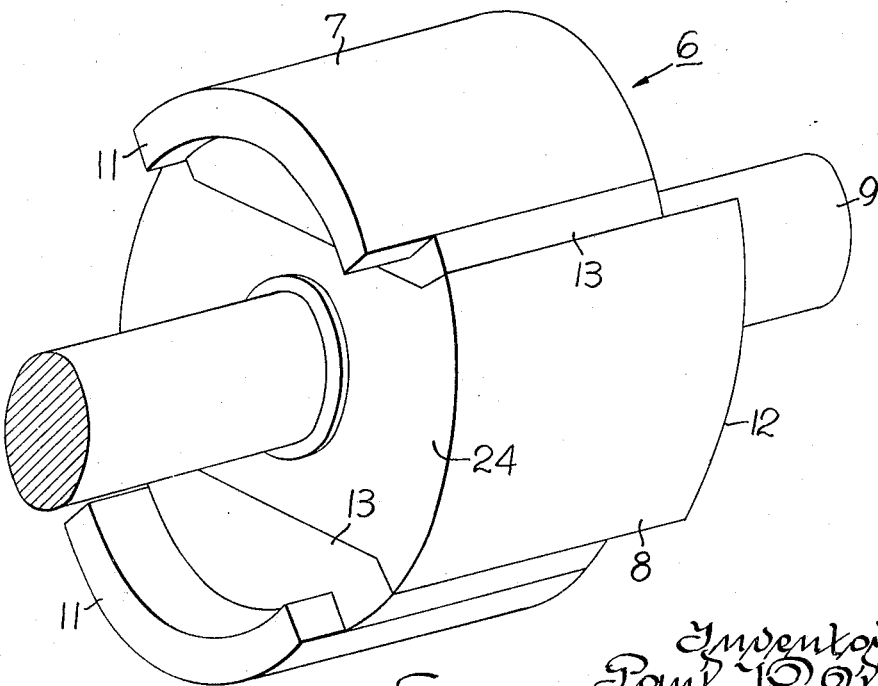

These and other objects of the subject invention will become more fully apparent as the following description is read in light of the attached drawing wherein:

FIG. 1 is a longitudinal sectional view of a part of a dynamoelectric machine constructed in accordance with the invention; and FIG. 2 is a perspective view of the rotor of the subject dynamoelectric machine.

The description of this machine will, for the purposes of clarity, be made in connection with an electric motor. However, it should be understood that it is not intended to so limit the invention which has application to all dynamoelectric machines.

Reference is made herein to a Lundell-type machine. It is believed that such a machine is sufficiently well known to those skilled in the art to which this invention pertains that a description is not necessary. However, if necessary, reference is made to U.S. Pat. No. 3,321,652.

Referring to the attached drawing, in particular FIG. 2, the rotor generally designated 6 is constructed of two magnetic sections 7 and 8. The rotor sections are connected to a nonmagnetic motor shaft 9 in any conventional manner.

The rotor sections 7 and 8 each include angularly spaced finger pairs 11 and 12, respectively. The fingers of each pair are disposed axially and are interleaved in the manner shown in FIG. 2. The number of fingers 11 and 12 of each rotor section is optional and corresponds to the number of pole pairs of the machine. The machine shown for purposes of illustration is a four-pole machine. The two rotor sections 7 and 8 are constructed of material of good magnetic permeability, such as steel, and they are magnetically isolated from one another by a nonmagnetic filler material 13 such as, for instance, aluminum.

Referring now more particularly to FIG. 1, conventional stator laminations 14 and winding 16 are positioned about the rotor 6 in the conventional manner.

Stationary excitation windings 17 are positioned on opposite axial ends of the rotor 6 symmetrical with the rotor shaft. Each excitation winding 17 is surrounded by a collector core 18. Each collector core 18 is provided with a pair of legs 19 and 21 which extend toward the rotor sections. The legs 19 of the collector cores 18 provide an air gap 22 with the fingers 11 and 12 of the rotor sections. The legs 21 of the collector cores 18 provide an air gap 23 with the bases 24 and 26 of the rotor sections 7 and 8.

These air gaps 22 and 23, together with the air gap 27 between the stator laminations 14 and the outer peripheral surface of the rotor, provide a dual magnetic flux path for the machine. The flux path is from the leg 19 across the air gap 22 into the finger 11 of rotor section 7 across the air gap 27 into the stator laminations, back across the air gap 27 into the adjacent rotor section 8. From here flux flows over two paths: across both right and left air gaps 22 and 23 into legs 19 and 21, respectively, of the collector cores 18.

With the arrangement above described it can be seen that a less expensive, more simplified, excited synchronous dynamoelectric machine has been defined. With this arrangement, even though the fingers 11 and 12 and the bases 24 and 26 present a variable reluctance to the exciting coils 17, these variations disappear as the fingers sweep past the continuous surface of the stationary collectors 18. With this arrangement no flux or voltage pulsation occurs, and a fixed nonpulsating level of excitation current is achieved. Furthermore, the yoke and housing of the machine are not a part of the flux path and, therefore, may be made of low cost materials normally used in conventional induction motors, such as cast iron or aluminum.

We claim:

1. A dynamoelectric machine comprising: a stator means of magnetic material; rotor means journaled for rotation within said stator means and defining a flux-traversing air gap therewith, said rotor including a plurality of sections magnetically isolated from one another with each having an annular base portion and a finger portion of magnetic material, said finger portions projecting axially toward each other and spaced angularly from one another and defining poles for cooperation with said stator means, each of said fingers terminating axially beyond the end of the base portion of the other section; and a stationary field-producing means including a coil portion and a core portion of magnetic material positioned at the axial end of said rotor means, said core portion having a pair of spaced legs, one of said legs forming a flux-traversing air gap with the base portion of one of said rotor sections and the other leg forming a flux-traversing air gap with the finger of the other of said rotor sections.

2. The dynamoelectric machine set forth in claim 1 wherein said stationary core surrounds said stationary coil.

* * * * *